(12) United States Patent
Demerath

(10) Patent No.: US 10,093,153 B2
(45) Date of Patent: Oct. 9, 2018

(54) AIR VENT

(71) Applicant: Illinois Tool Works Inc., Glenview, IL (US)

(72) Inventor: Michael Demerath, Hueffler (DE)

(73) Assignee: Illinois Tool Works Inc., Glenview, IL (US)

( * ) Notice: Subject to any disclaimer, the term of this patent is extended or adjusted under 35 U.S.C. 154(b) by 1048 days.

(21) Appl. No.: 13/693,068

(22) Filed: Dec. 4, 2012

(65) Prior Publication Data

US 2013/0149952 A1 Jun. 13, 2013

(30) Foreign Application Priority Data

Dec. 12, 2011 (DE) .................. 10 2011 120 915

(51) Int. Cl.
*B60H 1/34* (2006.01)

(52) U.S. Cl.
CPC ... *B60H 1/3421* (2013.01); *B60H 2001/3464* (2013.01)

(58) Field of Classification Search
CPC ...... B60H 1/3442; B60H 1/3435; B60H 1/34; B60H 2001/3471; B60H 2001/3421; B60H 2001/3464; B60H 1/3421; F24F 13/15
USPC ............... 454/152, 154, 155, 125, 153, 285; 49/74.1, 90.1, 87.1, 89.1
See application file for complete search history.

(56) References Cited

U.S. PATENT DOCUMENTS 2,755,524 A * 7/1956 Honer ................ E06B 7/084
160/104

3,447,443 A * 6/1969 Silvey .................. F24F 13/08
137/601.09
5,230,654 A * 7/1993 Bloomer ................ B60H 1/345
454/155
6,131,336 A  10/2000 Krause et al.
6,159,092 A * 12/2000 Elder ........................ 454/155
2006/0172680 A1* 8/2006 Gehring ............... B60H 1/3428
454/152
2011/0217914 A1* 9/2011 Marutschke ......... B60H 1/3428
454/152

FOREIGN PATENT DOCUMENTS

| DE | 7312237 | 3/1973 |
|----|---------|--------|
| DE | 2060368 | 7/1979 |
| DE | 19728305 | 1/1999 |
| DE | 10225811 | 1/2004 |
| DE | 10335219 | 4/2005 |
| DE | 10346853 | 5/2005 |
| DE | 102009044363 | 5/2011 |
| DE | 102007014103 | 7/2011 |
| JP | 60045424 | 3/1985 |
| JP | 2011112313 | 6/2011 |

* cited by examiner

*Primary Examiner* — Steven B McAllister
*Assistant Examiner* — Ko-Wei Lin
(74) *Attorney, Agent, or Firm* — Joseph M. Butscher; The Small Patent Law Group, LLC

(57) ABSTRACT

An air vent (7) having a housing (10) which includes an outflow opening (A), and having a plurality of vanes (12) which are associated with the outflow opening (A) of the housing (10) and are swivel-mounted, the vanes (12) being coupled to each other, is characterized in that at least three coupling members (18) are provided which couple the vanes (12) to each other and are arranged at a distance from each other along the vanes (12) and at a distance from the front edge (V) of the vanes (12).

22 Claims, 7 Drawing Sheets

AIR VENT

RELATED APPLICATION

This application claims priority from German Patent Application No. 10 2011 120 915.1, filed Dec. 12, 2011, the subject matter of which is incorporated herein by reference.

BACKGROUND OF THE INVENTION

The invention relates to an air vent having a housing which includes an outflow opening, and having a plurality of vanes which are associated with the outflow opening of the housing and are swivel-mounted, the vanes being coupled to each other.

Such an air vent is used in particular in the climate control of the interior of a motor vehicle. The air that is provided by the heating/air-conditioning system flows through the air vent into the interior of the vehicle, the direction of the air flow being adjustable when using the swiveling vanes. If the vanes are arranged horizontally, for example, swiveling of the vanes allows an adjustment such that the air flow enters the vehicle interior from the dashboard obliquely upward, fairly horizontally, or obliquely downward. In addition to the vanes that are associated with the outflow opening of the housing and are therefore visible to a vehicle occupant, most vents have further guide members provided inside the housing, the swivel axes of the guide members being perpendicular to the swivel axes of the vanes. These can be used for adjusting the direction of the air flow in a second direction, in the above example to the left, centrally or to the right.

SUMMARY OF THE INVENTION

The object of the invention consists in providing an air vent which has a very elongated outflow opening, i.e. in which the length of the outflow opening and thus the length of the vanes is very much greater than the height of the outflow opening while at the same time a visually appealing design is possible and a sufficient loading capacity of the vanes is ensured.

To achieve this object, according to the invention provision is made for at least three coupling members which couple the vanes to each other and are arranged at a distance from each other along the vanes and at a distance from the front edge of the vanes. The invention is based on the fundamental concept of coupling the vanes to each other, more specifically not only on one or on both ends of the vanes as is usual in most cases in the prior art, but at a plurality of locations along the length of the vanes. In this way, a system of interconnected vanes is produced, which as a whole takes up loads acting on a particular point of a vane. For example, when a single one of the vanes is loaded centrally with a force that acts perpendicularly to the plane defined by the vane, such as, e.g., by a finger of a vehicle occupant, it is not only the flexural rigidity of the loaded vane that counteracts a deflection of the vane, but, in addition, the flexural rigidity of all other vanes which are connected with the loaded vane by means of the coupling members. This allows very long vanes to be used, which, with a view to the visual appearance and to aerodynamic requirements, need not be designed to be thicker than the vanes known so far while still having a comparatively high overall loading capacity.

According to a configuration of the invention, at least four coupling members are provided. This allows the coupling members to be arranged at a relatively small distance from each other, for example on the two ends of all vanes and on either side of the center.

Preferably, provision is made that the vanes have a continuous front edge on the side facing away from the inside of the housing. A continuous front edge of the vanes is desirable in particular with a view to the visual appearance.

According to a configuration of the invention, provision is made that the vanes have a swivel axis arranged at a distance from the front edge, in particular roughly in the center of the vanes, and that the coupling members are connected with the vanes on the swivel axes. In this configuration, the coupling members remain stationary when the vanes are swiveled about their swivel axes.

Preferably, provision is made here that the coupling members are firmly connected with the housing. In this configuration, each of the coupling members acts as a housing-fixed bearing point, so that an especially high loading capacity is obtained.

According to an alternative configuration, provision is made that the vanes have a swivel axis arranged near their front edges, and that the coupling members are connected with the vanes at a distance from the swivel axis. In this configuration, when the vanes are swiveled, the front edges of the vanes do not carry out an upward or downward movement, but are merely rotated.

According to one embodiment, provision is made here that the coupling members are only coupled to the vanes. This configuration distinguishes itself by a simple structure since no measures whatsoever are necessary in order to connect the coupling members with other parts.

According to an alternative configuration a connecting member is provided which is swivel-mounted at the housing and with which the coupling members are connected. The connecting member, which is designed to be as torsionally rigid as possible, couples the coupling members among each other, so that a load acting on a particular point of a vane is absorbed uniformly by the coupling members.

Preferably, provision is made here that the connecting member is mounted at the housing by means of a plurality of housing bearings, and that the housing bearings are arranged near the connection of the coupling members with the connecting member. In this configuration, the coupling members are supported on the housing by means of the connecting member, so that any undesirable deflection of the vanes is counteracted.

According to a configuration of the invention, provision is made that the connecting member is arranged outside of the outflow opening. In this case, there is no need to take the flow conditions into consideration when configuring the connecting member, so that the connecting member may also be designed with a larger cross-section, which is of advantage to the rigidity.

Preferably, provision is made that the connecting member is arranged in the same plane as the vanes. This allows the coupling members to be designed linearly, so that they are only subjected to tensile and compressive loading. As a result, the coupling members may be given a very slim design.

According to one embodiment, provision is made that the connecting member is arranged inside the housing. In this embodiment, there is no need to provide any additional space outside the housing for receiving the connecting member.

According to one embodiment, provision is made that the coupling members are coupled to the connecting member on the side thereof facing away from the outflow opening. In this embodiment, the connecting member swivels in the same direction as the vanes, so that the connecting member acts as an additional vane.

According to an alternative configuration, provision is made that the coupling members are coupled to the connecting member on the side thereof facing the outflow opening. This causes the edge of the coupling member facing away from the vanes to remain on the same level when the vanes are swiveled, so that no structural space is necessary there for accommodating the swivel motion of the coupling member.

Preferably, provision is made here that the connecting member is connected with one of the vanes by an extension on the coupling members. In this way, all in all an especially stiff configuration is obtained.

According to a configuration of the invention, provision is made that the vanes have a length of more than 150 mm, in particular of more than 200 mm and particularly preferably of more than 250 mm. This constitutes very great progress as compared with conventional air vents, in which the vanes have a length of typically less than 100 mm.

BRIEF DESCRIPTION OF THE DRAWINGS

The invention will be described below with reference to various embodiments which are illustrated in the accompanying drawings, in which.

DESCRIPTION OF EXEMPLARY EMBODIMENT

Figure 1:
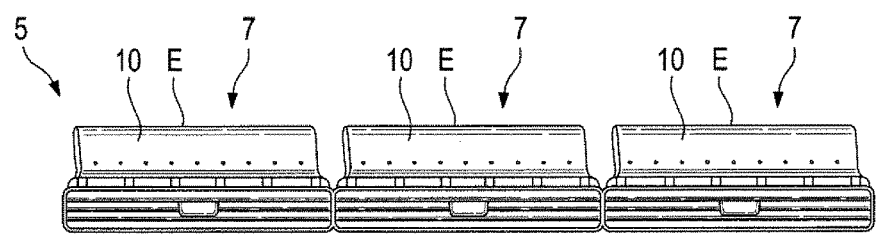
FIG. 1 shows a perspective view of an air vent unit formed of a plurality of air vents according to the invention.

FIG. 1 shows an air vent unit 5 which is formed of a plurality of air vents 7 arranged directly side by side. Each air vent has a width of more than 250 mm and a height on the order of 60 mm. This means that, in comparison with known air vents, the air vents are of a very elongated configuration. The air vent unit 5 may be built into a dashboard 9 (see FIG. 2), so that a very broad air outflow region is formed which, in this case, has a width of 800 mm.

Figure 3:
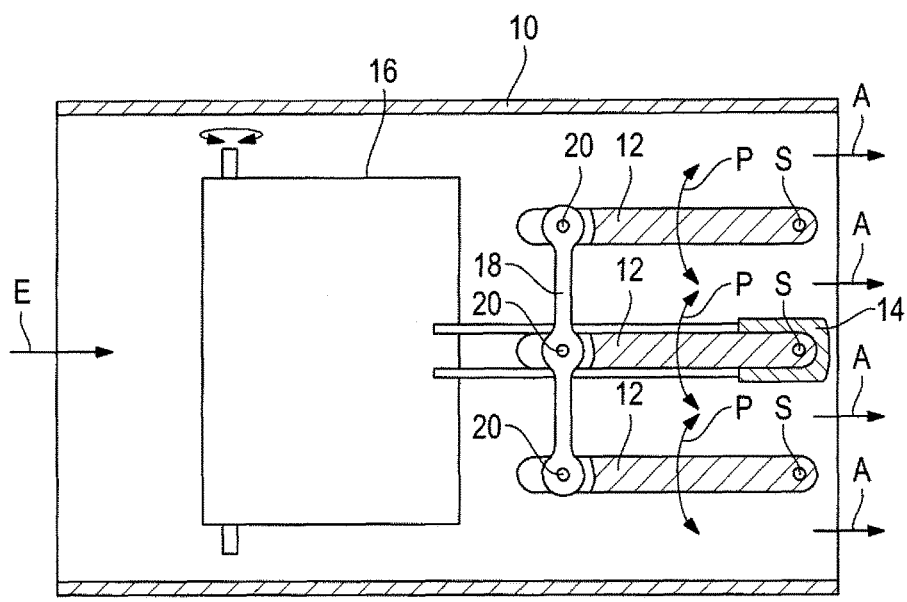
FIG. 3 shows a schematic sectional view of an air vent according to a first embodiment of the invention.
Figure 4:
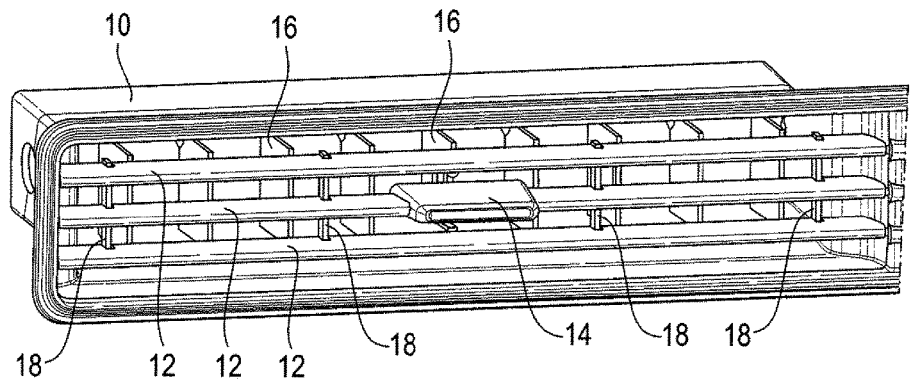
FIG. 4 shows a perspective view of the air vent of FIG. 3.

Each air vent includes a housing 10 (see also FIGS. 3 and 4) which includes an inflow opening E and an outflow opening A. The inflow opening is in connection with a heating/air conditioning system of a motor vehicle, and the air flows through the outflow opening into the interior of the vehicle.

Arranged in the housing 10 is a plurality of vanes 12 which are mounted in the housing for swiveling about a swivel axis S. In the first embodiment shown in FIGS. 3 and 4, the swivel axis S is arranged near the front edges V of the vanes, that is, on the edge located on the side of the outflow opening A. The front edges V of the vanes 12 are those edges of the vanes that are visible from the interior of the vehicle. In order to adjust the vanes about the swivel axes S in the direction of the arrows P, an operating element 14 is provided by which the vanes can be swiveled. The operating element 14 also cooperates with a plurality of guide members 16 which are likewise mounted in the housing for swiveling motion. The swivel axis of the guide members 16 is perpendicular to the swivel axis S of the vanes 12 here. As viewed from the vehicle interior, the guide members 16 lie behind the vanes 12, that is, closer to the inflow opening E.

The vanes 12 are connected with each other by a plurality of coupling members 18 which are rotatably connected with each vane 12 by a swivel joint 20. The swivel joints 20 may be formed, for example, by pivots which are arranged on the vanes 12 and engage into openings in the coupling member 18. The swivel joints 20 are arranged at a distance from the swivel axes S of the vanes 12, for example in the rear third of the vane or even on the rear edge. Thereby a continuous, uninterrupted front edge V is obtained over the entire width of the vanes since the incisions for receiving the coupling members 18 need not extend as far as to the front edge.

The coupling members 18 serve, for one thing, to transmit the swivel movement of the vane that is connected with the operating element 14 to the other vanes. But for this purpose one single coupling member would be required, as is the case in the prior art. In accordance with the invention, however, several coupling members are arranged along the vanes 12 at a distance from each other. In the embodiment shown, four coupling members are used. The function of the coupling members consists in coupling the vanes among each other in such a way that transverse loads that are exerted on a vane are simultaneously borne by all vanes.

The effect of the plurality of coupling members that are provided along the length of the vanes can be shown clearly by the following example. If, for instance, the center vane were to be loaded with a force of 20 N which acts perpendicularly to the plane of the vane, in the case of typical values for the width of the vane, the modulus of elasticity of the material selected, a typical thickness, and a length of 267 mm the vane would be deflected by roughly 7.7 mm. It is hardly possible to reduce this deflection solely by design changes to the vane per se since other dimensions of the vane can hardly be realized for reasons of design. A wider vane would result in that a larger travel of the rear edge of the vane would have to be possible when swiveling. A thicker vane results in a reduction of the free outflow cross-section. In addition, problems in injection molding would arise. Also, it is hardly possible to employ materials having a higher modulus of elasticity since even in the case of conventional vanes, materials are made use of that have a very high modulus of elasticity, in particular glass fiber reinforced materials.

But owing to the coupling members, the deflection of the individual loaded vanes is now counteracted by the stiffness of the packet made up of all three vanes since the non-loaded vanes also bear part of the load. As a result, with the same parameters a deflection of merely 2.2 mm is produced. This improvement is brought about without the coupling members 18 having to cooperate with other parts, aside from the vanes 12.

Figure 5:
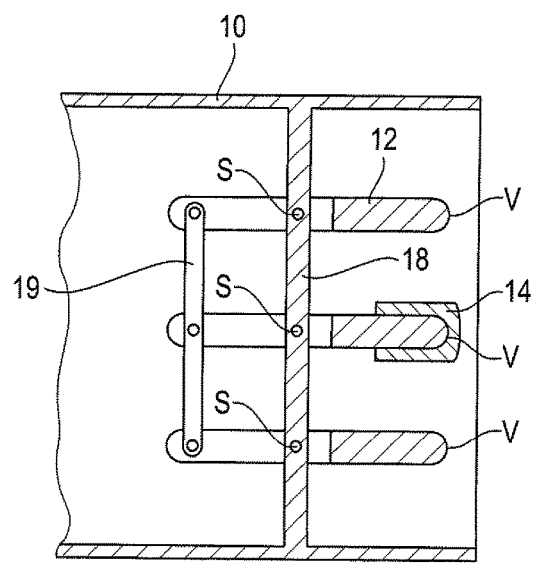
FIG. 5 shows a schematic sectional view of an air vent according to a second embodiment of the invention.
Figure 6:
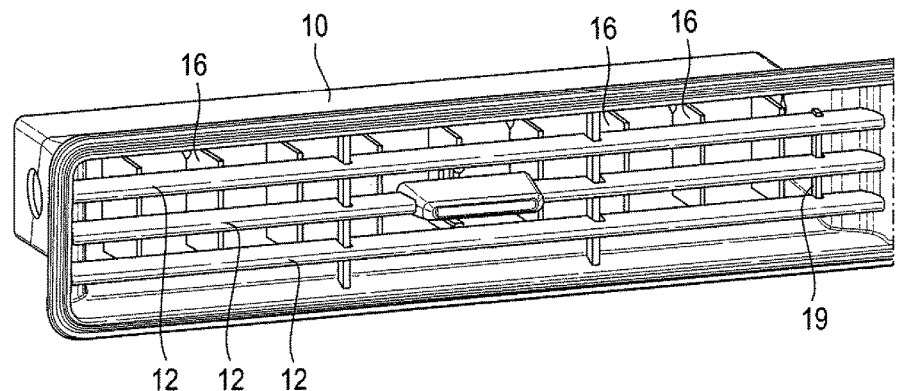
FIG. 6 shows a perspective view of the air vent of FIG. 5.

FIGS. 5 and 6 show an air vent according to a second embodiment. For the components known from the first embodiment, the same reference numbers are used and reference is made to the above explanations in this respect.

The difference between the first and second embodiments consists in that in the second embodiment the vanes 12 are swivel-mounted roughly centrally, rather than at their front edges. In this embodiment the coupling members are continuous webs that are formed in one piece with the housing 10 and extend roughly parallel to the shorter lateral edges of the housing. Since the swivel axes S, by means of which the vanes 12 are mounted on the coupling members 18, are arranged at a distance from the front edge V, the vanes exhibit a continuous front edge in the second embodiment as well, which is of advantage in terms of appearance.

Figure 2:
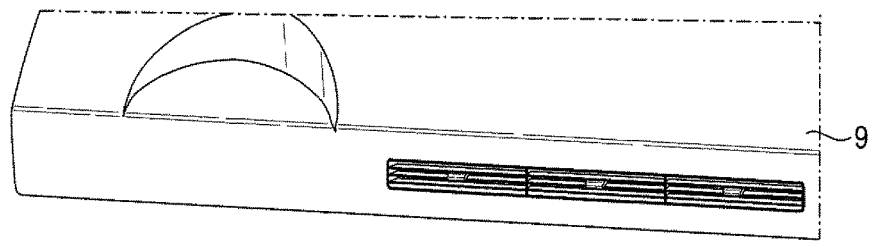
FIG. 2 shows the air vent unit of FIG. 1, installed in a dashboard.

To transfer the swivel motion of the middle vane, provided with the operating element 14, to the two outer vanes, provision is made for an additional coupling member 19 which corresponds to the coupling member 18 known from FIGS. 1 and 2 as regards its configuration, but does not, or at most insignificantly, serve to stiffen the pack of vanes.

Figure 7:
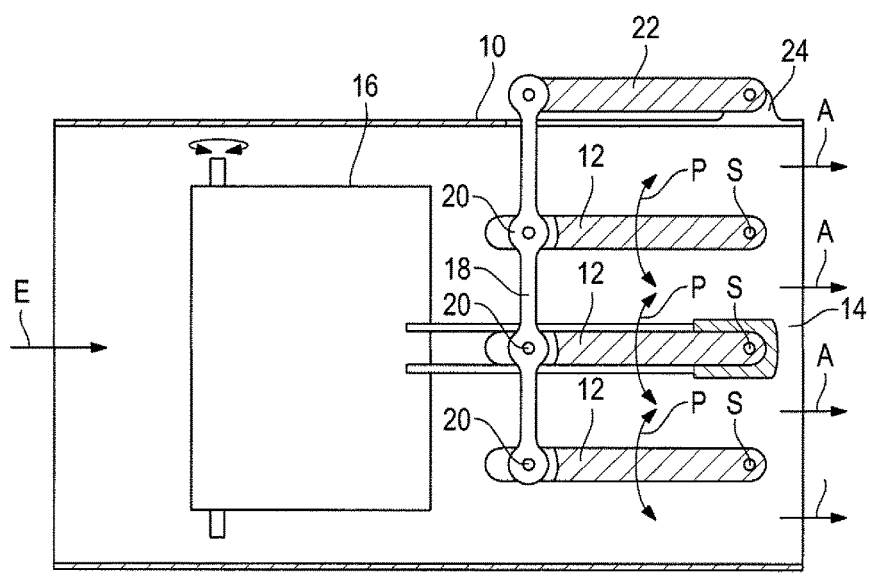
FIG. 7 shows a schematic sectional view of an air vent according to a third embodiment of the invention.
Figure 8:
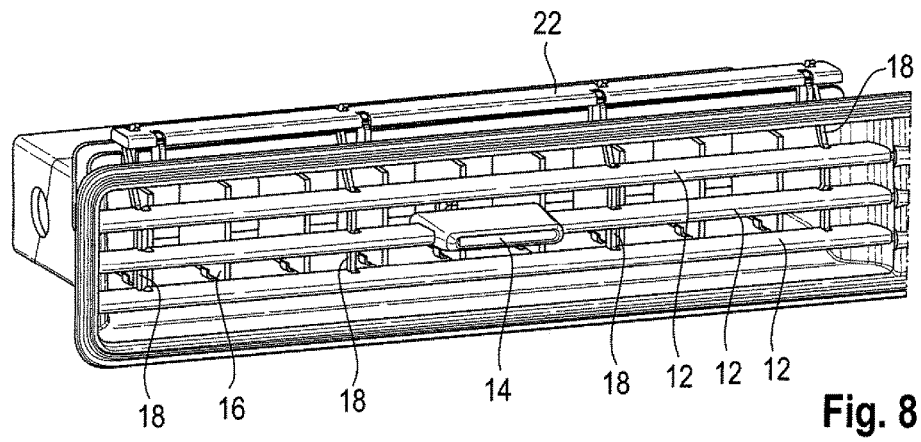
FIG. 8 shows a perspective view of the air vent of FIG. 7.
Figure 9:
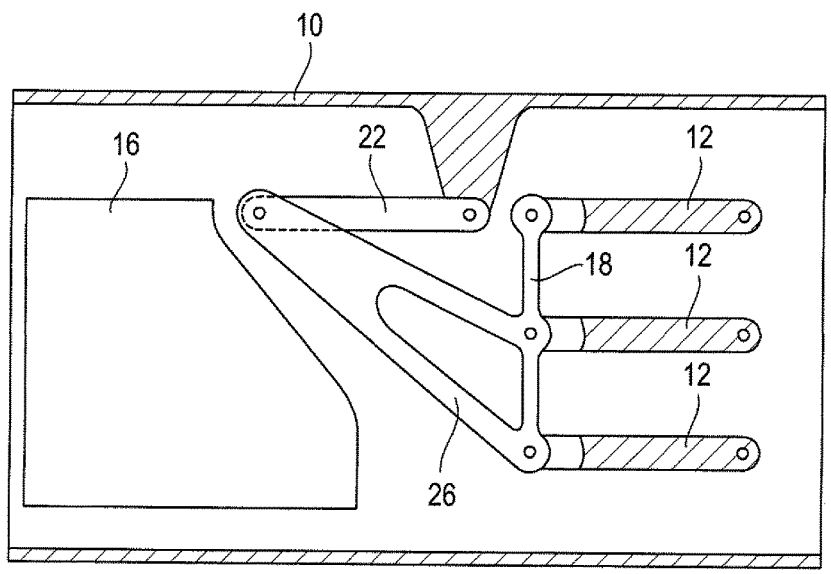
FIG. 9 shows a schematic sectional view of an air vent according to a fourth embodiment of the invention.

FIGS. 7 and 8 show a third embodiment of the invention. The same reference numbers are used for the parts known from the previous embodiments, and reference is made to the above explanations in this regard.

The third embodiment is based on the first and second embodiments, but uses an additional connecting member 22 which is connected with the housing for swiveling motion by means of a plurality of housing bearings 24. In the present case, the connecting member 22 is arranged outside of the outflow opening A, here on the top side of the housing.

The coupling members 18 are lengthened beyond the topmost vane and extend as far as to the connecting member 22, with which they are coupled for swiveling motion, each coupling member 18 having a housing bearing 24 associated with it. The arrangement of the connecting member 22 outside of the housing and above the vanes allows the coupling members 18 to be of an essentially linear design, so that they are not, or only to a very small degree, subjected to bending loads.

Owing to the connecting member 22, a considerable stiffening of the entire pack of vanes is obtained. This stiffening is based on the combination of the support by the housing bearings 24 with the torsional strength of the connecting member. When a load on a specific point of, for example, the middle vane at the operating element 14 is assumed, which acts on the vane 12 in a direction perpendicular to the plane defined by it, a deflection can only be produced if (because of the coupling members 18 that are arranged on both sides of the operating element 14) the entire pack of vanes with all three vanes is deflected. Furthermore, the two coupling members 18 which are arranged on both sides of the operating element 14 are connected with the connecting member 22 which, in turn, is supported at the housing bearings 24. If the coupling members arranged on both sides of the operating element 14 are to shift due to the action of the load, the connecting member 22 would have to be swiveled about the housing bearings 24. But this would only be possible when all of the coupling members were to be adjusted in the same direction. But this is not the case because even if the pack of vanes were deflected in the middle, the outer coupling members at the outer edges thereof would not or only imperceptibly be affected thereby; owing to the bearing in the housing, the vanes 12 barely yield there. From this it follows that a swiveling movement of the connecting member 22 would only be possible if it is twisted; the front edge of the connecting member 22 facing the outflow opening would have to be swiveled in the central region of the connecting member while the outer regions remain at their level substantially unchanged. It can be seen that owing to the torsional stiffness of the connecting member 22, the coupling members 18 are braced against each other, so that the pack of vanes as a whole is stiffened.

Even with a thickness of the connecting member 22 which corresponds to the thickness of the vanes, the torsional strength is already so great that a substantial stiffening of the entire pack of vanes is obtained. In the exemplary case of a load as indicated above, use of the connecting member 22 results in a deflection of only 0.6 mm. In case this stiffening effect should not be sufficient, the connecting member 22 could also be made thicker; since it is located outside of the outflow opening A, this would not have a disadvantageous effect on the flow cross-section.

Figure 10:
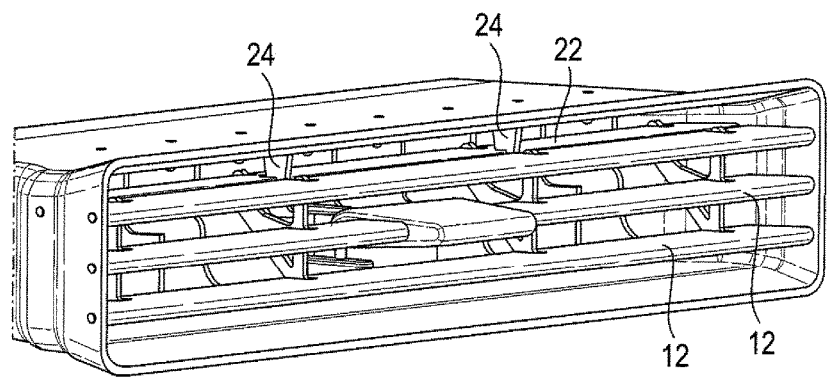
FIG. 10 shows a perspective view of the air vent of FIG. 9.
Figure 11:
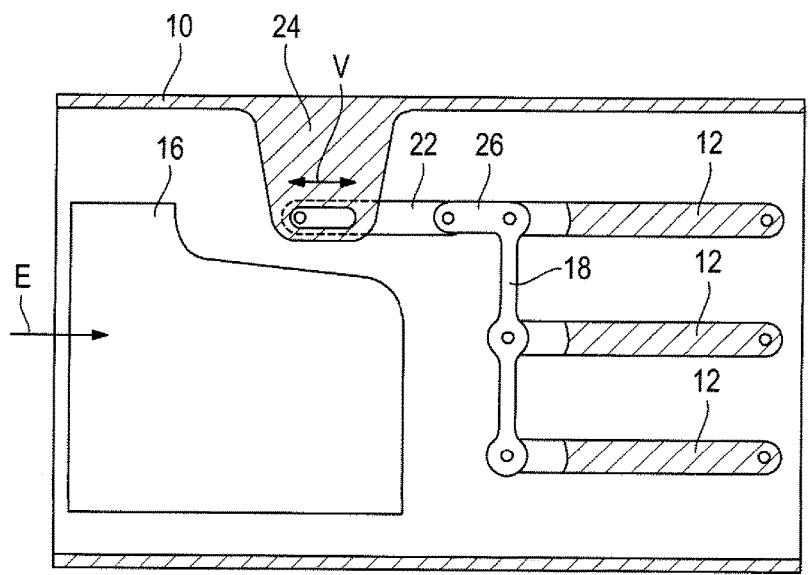
FIG. 11 shows a schematic sectional view of an air vent according to a fifth embodiment of the invention.

FIGS. 10 and 11 show a fourth embodiment of the invention, which in terms of its principle is based on the third embodiment. The difference from the third embodiment consists in that the connecting member 22 is located inside the housing and, as viewed from the outflow opening, behind the upper one of the vanes 12. The coupling members 18 are provided with an extension 26 which, proceeding from the vanes 12, extends further into the interior of the housing and is connected with the connecting member 22. Since the kinematics is the same for the vanes 12 and the connecting member 22, that is, the coupling member 18 engages them on the side of the swiveling axes thereof facing away from the outflow opening, the vanes 12 and the connecting member 22 are swiveled in the same direction.

In the fourth embodiment, too, a considerable stiffening of the entire pack of vanes can be achieved owing to the torsional stiffness of the connecting member 22. In the exemplary case mentioned above, a deflection of 1.3 mm is produced.

FIGS. 10 and 11 show a fourth embodiment of the invention. The same reference numbers are used for the parts known from the previous embodiments, and reference is made to the above explanations in this regard.

Similar to the fourth embodiment, in the fifth embodiment the connecting member 22 is arranged inside the housing and, as viewed from the outflow opening, behind the uppermost vane 12. Unlike in the fourth embodiment, however, the arrangement of the housing bearing 24 and of the connection with the coupling member 18 is interchanged for the connecting member 22; in the fifth embodiment, the connection with the coupling member 18 is arranged closer to the outflow opening than the housing bearing 24. The connection between the coupling members 18 and the connecting member 22 is effected by short extensions 26 on the coupling members. For mounting the connecting member 22 on the housing, the housing bearing 24 is in the form of a sliding guide here, for example by means of a slot in a material web that is connected with the housing 10 and into which a pivot engages which is provided on the connecting member 22. Owing to the sliding mounting, the edge of the connecting member 22 facing away from the outflow opening can execute a shifting movement in the direction of the arrow V of FIG. 11, in addition to a swivel movement.

Figure 12:
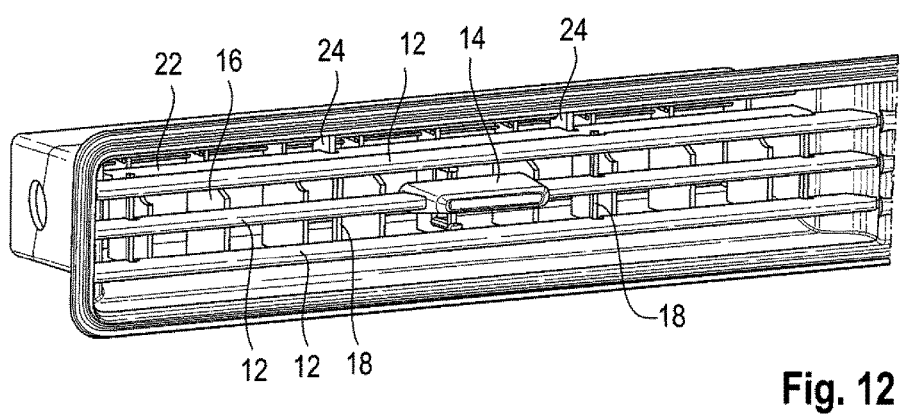
FIG. 12 shows a perspective view of the air vent of FIG. 11.

As can be seen in FIG. 12, the housing bearings are associated with the coupling members 18 in the fifth embodiment as well. Therefore, a support of the connecting member 22 is effected in the immediate vicinity of the coupling members 18 which introduce the overall load on the vanes into the connecting member 22.

In the fifth embodiment, too, a considerable stiffening of the entire packet of vanes is obtained as a result of the connecting member 22. In the fifth embodiment, a deflection of 1.8 mm arises for the exemplary case mentioned above.

The invention claimed is:

1. An air vent comprising:
a housing having an outflow opening;
a plurality of vanes associated with the outflow opening, each of the plurality of vanes being rotatably connected to the housing at a swivel axis arranged near a front edge of each of the plurality of vanes; and
at least three coupling members pivotally connected to each of the plurality of vanes to connect the plurality of vanes together such that movement of one of the plurality of vanes results in movement of all of the plurality of vanes, the at least three coupling members being spaced along a length of each of the plurality of vanes and positioned rearward of the front edge of each of the plurality of vanes.

2. The air vent according to claim 1, wherein the plurality of vanes have a swivel axis arranged a distance from the front edge proximate to a center of each of the plurality of vanes, the at least three coupling members being connected to the swivel axis of each of the plurality of vanes.

3. The air vent according to claim 1, wherein a connecting member is swivel-mounted to the housing and connected to the at least three coupling members.

4. The air vent according to claim 1 wherein the connecting member is outside of the outflow opening.

5. An air vent comprising:
a housing including an outflow opening;
a plurality of swivel-mounted outlet vanes adjacent to the outflow opening of the housing; and
at least three coupling members coupled to each of the outlet vanes, wherein the at least three coupling members are arranged at a distance from each other along a length of the outlet vanes and at a rearward distance from front edges of the outlet vanes, wherein each of the outlet vanes has a swivel axis arranged near the front edges, and wherein each of the at least three coupling members is pivotally connected to each of the outlet vanes in a swivel joint at a rear edge of each of the outlet vanes.

6. The air vent according to claim 5, wherein at least four coupling members are coupled to each of the outlet vanes.

7. The air vent according to claim 5, wherein each of the outlet vanes has a continuous front edge on a side facing away from an inside of the housing.

8. The air vent according to claim 5, wherein the at least three coupling members are connected to the vanes at a distance from the swivel axis.

9. The air vent according to claim 8, wherein the at least three coupling members are only coupled to the vanes.

10. The air vent according to claim 8, wherein a connecting member is swivel-mounted to the housing and connected to the at least three coupling members.

11. The air vent according to claim 10, wherein the connecting member is mounted to the housing by a plurality of housing bearings arranged near a connection of the coupling members with the connecting member.

12. The air vent according to claim 10 wherein the connecting member is arranged outside of the outflow opening.

13. The air vent according to claim 12, wherein the connecting member is arranged in the same plane as the outlet vanes.

14. The air vent according to claim 10 wherein the connecting member is arranged inside the housing.

15. The air vent according to claim 14, wherein the at least three coupling members are coupled to a side of the connecting member facing away from the outflow opening.

16. The air vent according to claim 14, wherein the at least three coupling members are coupled to a side of the connecting member on facing the outflow opening.

17. The air vent according to claim 16, wherein the connecting member is connected to one of the outlet vanes by an extension on at least one of the at least three coupling members.

18. The air vent according to claim 14, wherein the connecting member is in the form of an additional vane.

19. The air vent according to claim 5, wherein the outlet vanes have a length of more than 150 mm.

20. The air vent according to claim 5, wherein the swivel axis of each of the outlet vanes and the at least three coupling members are positioned at opposite ends of the outlet vanes.

21. An air vent comprising:
a housing including an inflow opening and an outflow opening;
a plurality of swivel-mounted guide members adjacent to the inflow opening of the housing;
a plurality of swivel-mounted outlet vanes adjacent to the outflow opening of the housing;
an operating element configured to swivel the guide members and the outlet vanes; and
at least three coupling members coupled to each of the outlet vanes, wherein the at least three coupling members are arranged at a distance from each other along a length of the outlet vanes and at a rearward distance from front edges of the outlet vanes, wherein each of the outlet vanes has a swivel axis arranged near the front edges, and wherein each of the at least three coupling members is pivotally connected to each of the outlet vanes in a swivel joint at a rear edge of each of the outlet vanes.

22. The air vent of claim 21, wherein the swivel axis of each of the outlet vanes is perpendicular to a swivel axis of each of the guide members.

* * * * *